United States Patent
Kim

(10) Patent No.: US 10,783,809 B2
(45) Date of Patent: Sep. 22, 2020

(54) ROLLABLE DISPLAY DEVICE

(71) Applicant: LG Display Co., Ltd., Seoul (KR)

(72) Inventor: JeongHun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/526,536

(22) Filed: Jul. 30, 2019

(65) Prior Publication Data

US 2020/0043386 A1    Feb. 6, 2020

(30) Foreign Application Priority Data

Jul. 31, 2018    (KR) .................. 10-2018-0089571

(51) Int. Cl.
  *G09F 9/30*    (2006.01)
  *G06F 1/16*    (2006.01)
  *G03B 21/58*   (2014.01)

(52) U.S. Cl.
   CPC ............ *G09F 9/301* (2013.01); *G06F 1/1652* (2013.01); *G03B 21/58* (2013.01); *G09G 2380/02* (2013.01)

(58) Field of Classification Search
   CPC .................... G09F 9/301; G03B 21/58
   See application file for complete search history.

(56) References Cited

U.S. PATENT DOCUMENTS

| | | | |
|---|---|---|---|
| 10,299,391 B2 | 5/2019 | Kim et al. | |
| 2011/0011542 A1 | 1/2011 | Kuroi | |
| 2015/0340004 A1 | 11/2015 | Pang | |
| 2016/0155965 A1 | 6/2016 | Kusuura | |
| 2016/0161983 A1* | 6/2016 | Lee | G09F 9/301 |
| | | | 361/749 |
| 2017/0156219 A1 | 6/2017 | Heo et al. | |
| 2017/0318689 A1 | 11/2017 | Kim et al. | |
| 2018/0070466 A1* | 3/2018 | Kim | G09F 9/301 |
| 2019/0204874 A1* | 7/2019 | Kim | G06F 1/1643 |
| 2019/0246512 A1* | 8/2019 | Heo | G06F 1/1681 |

FOREIGN PATENT DOCUMENTS

| | | |
|---|---|---|
| TW | 201447838 A | 12/2014 |
| TW | 201805910 A | 2/2018 |

OTHER PUBLICATIONS

Extended European Search Report, European Patent Application No. 19189132.4, dated Dec. 13, 2019, 12 pages.
Office Action, Taiwan Intellectual Property Office Patent Application No. 108127060, dated May 11, 2020, 10 pages.

* cited by examiner

*Primary Examiner* — Christopher E Mahoney
(74) *Attorney, Agent, or Firm* — Fenwick & West LLP

(57) ABSTRACT

A rollable display device includes a first roller part, a second roller part, a first assembly, and a second assembly. The first assembly is configured to be wound around the first roller part or unwound from the first roller part. The second assembly is configured to be wound around the second roller part. The first assembly includes a first flexible display panel and a first support structure body. The first support structure body has a plurality of divided structures, and the first support structure body is coupled to the back surface of the first flexible display panel to support the first flexible display panel. The second assembly includes a second support structure body. The second support structure body has a plurality of divided structures, and the second support structure body is coupled to the first support structure body by a magnetic force to support the first flexible display panel.

20 Claims, 12 Drawing Sheets

[FIG. 1]
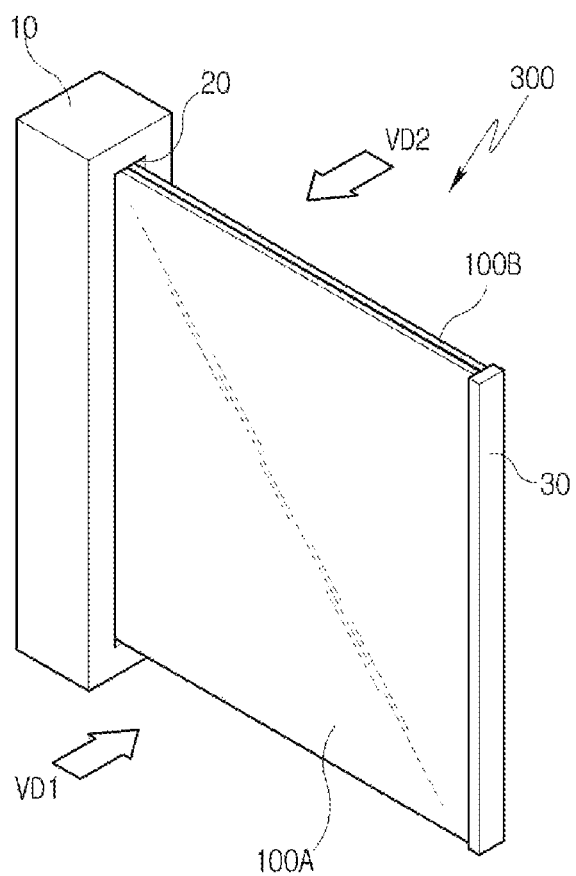

[FIG. 2]
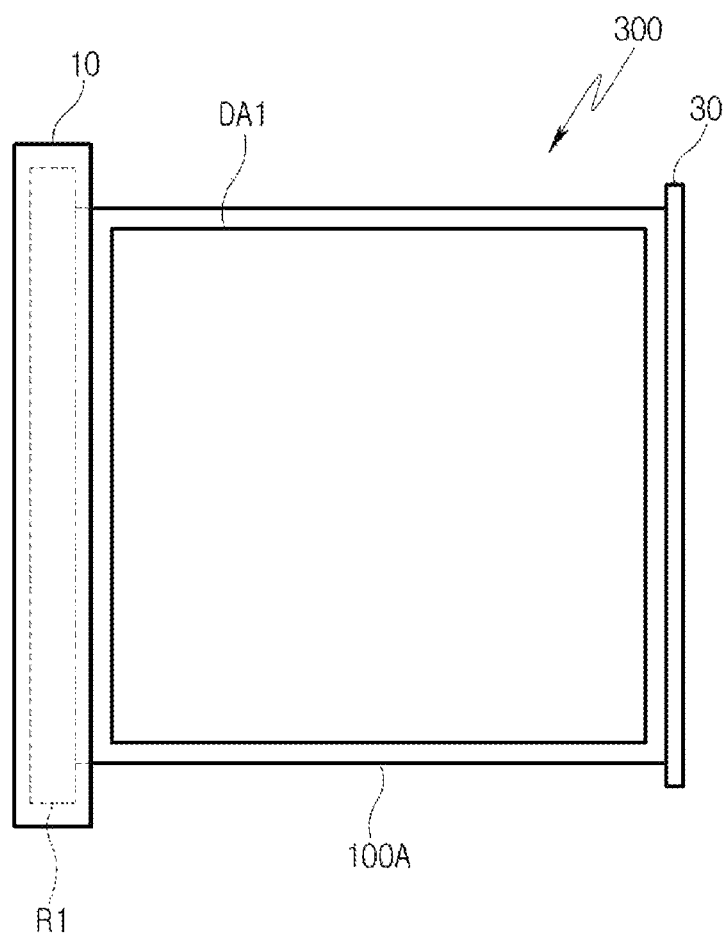

[FIG. 3]
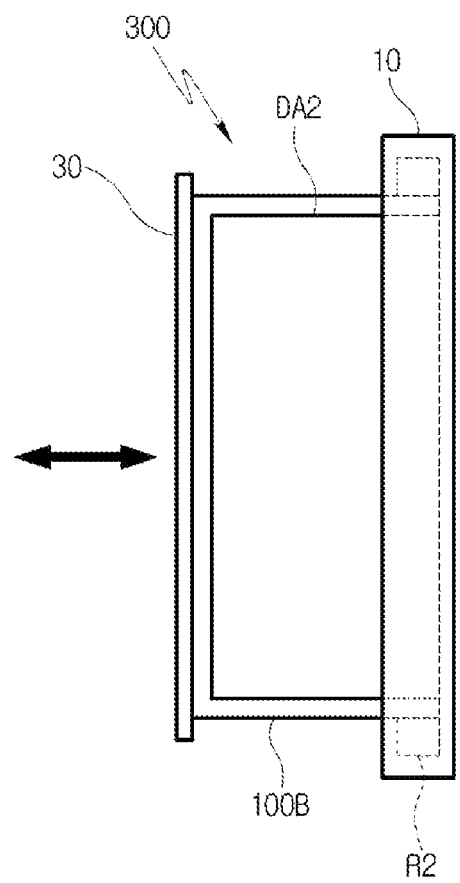

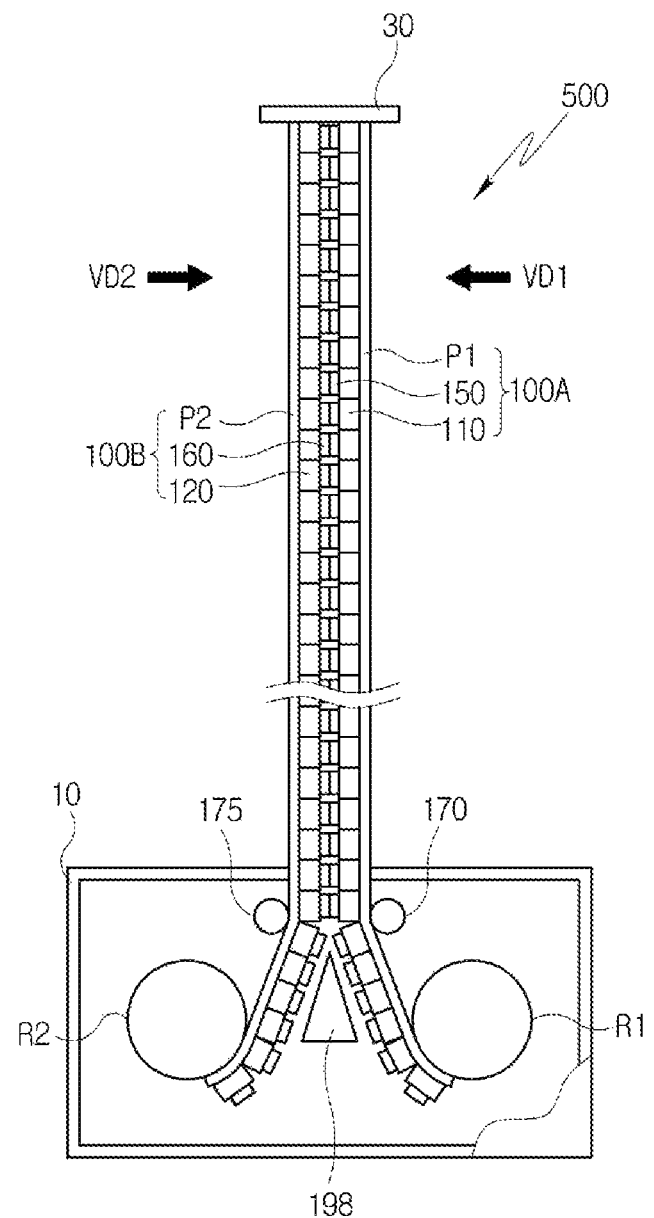
[FIG. 4]

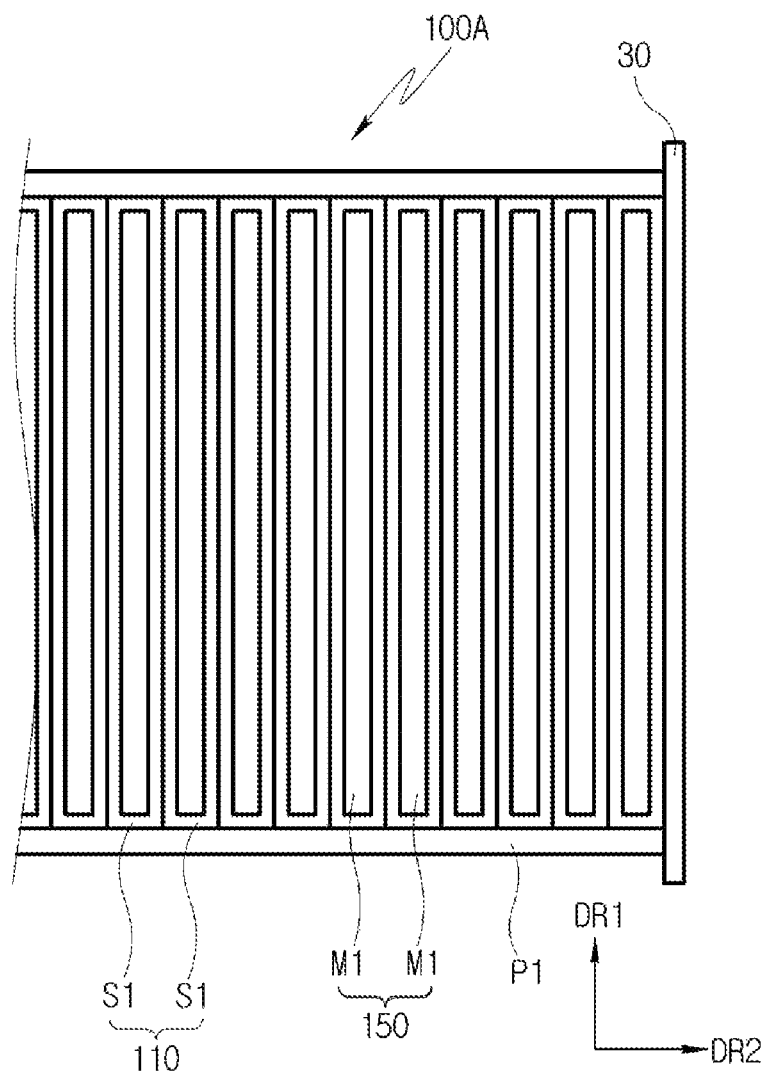
[FIG. 5A]

[FIG. 5B]
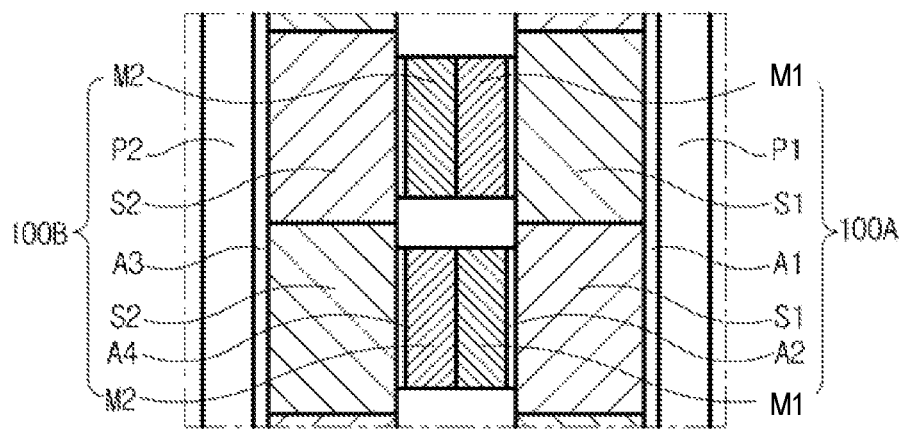
[FIG. 6]
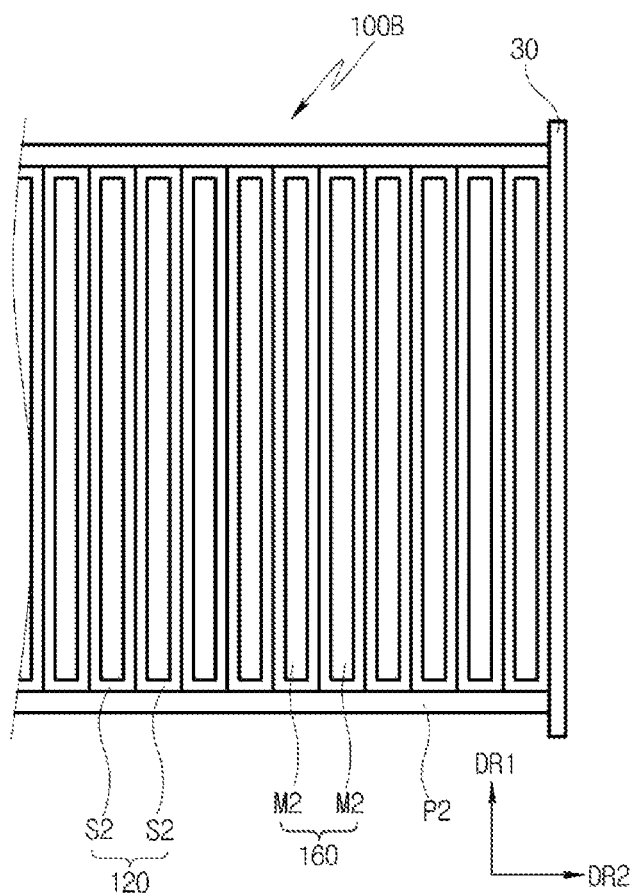

[FIG. 7]
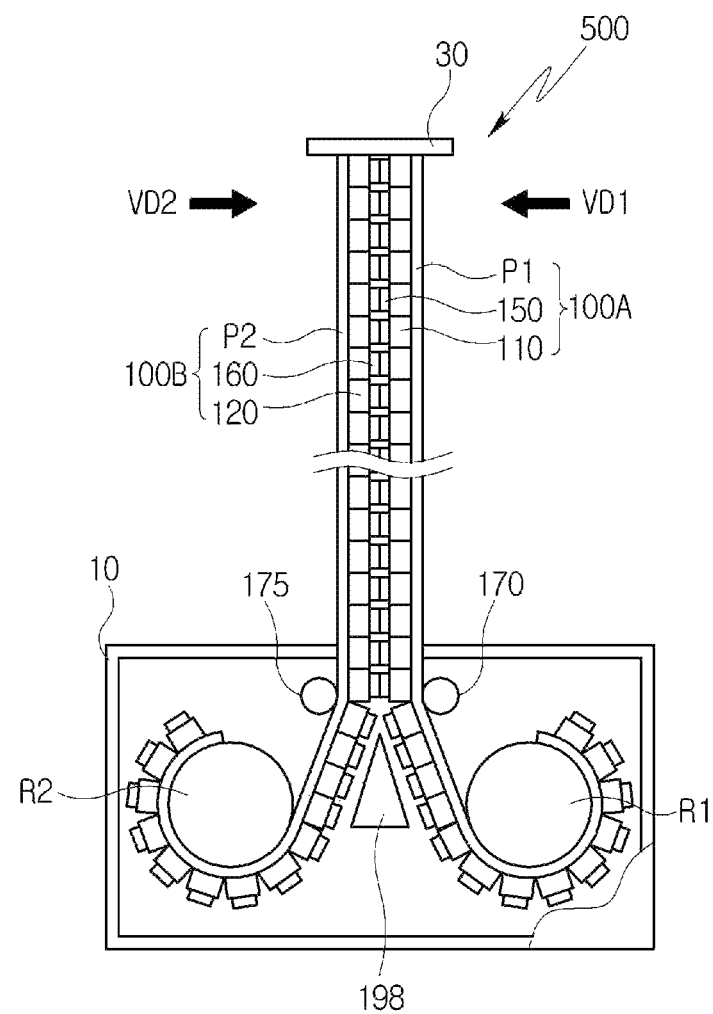

[FIG. 8]
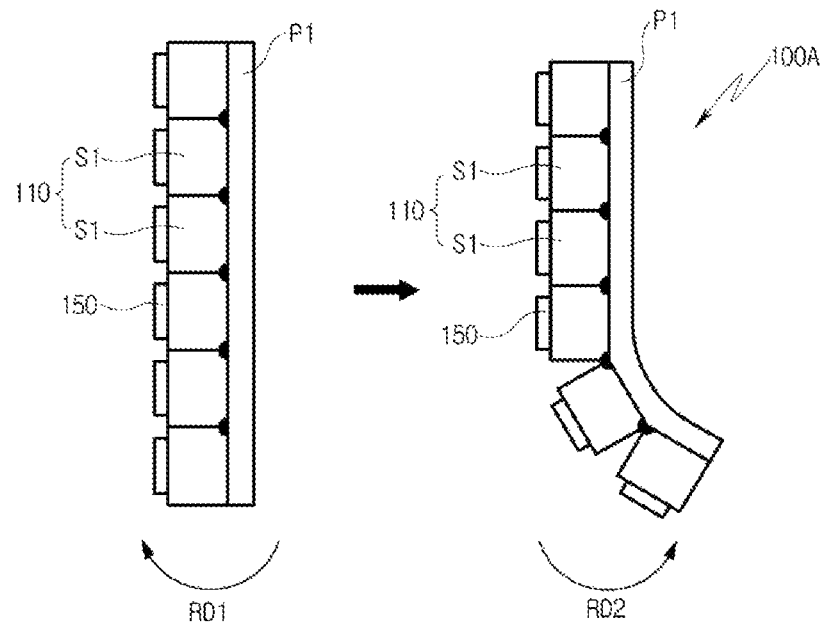
[FIG. 9]
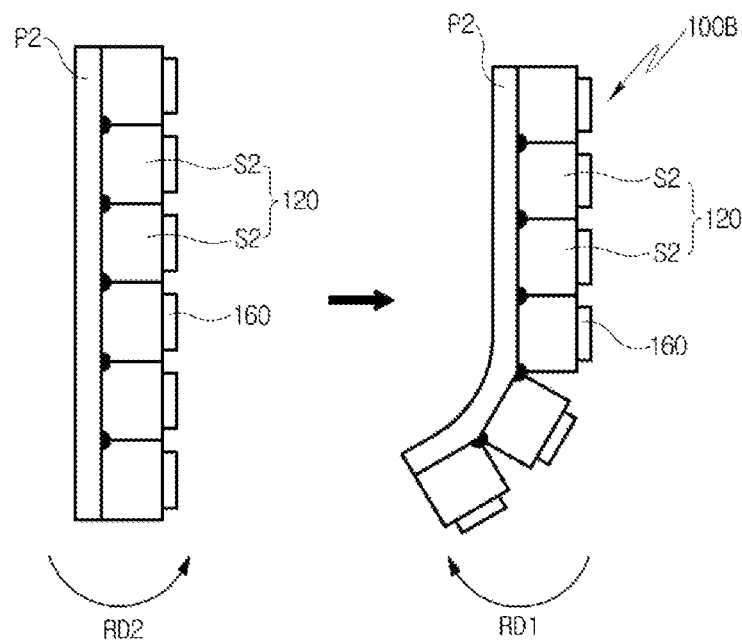

[FIG. 10]
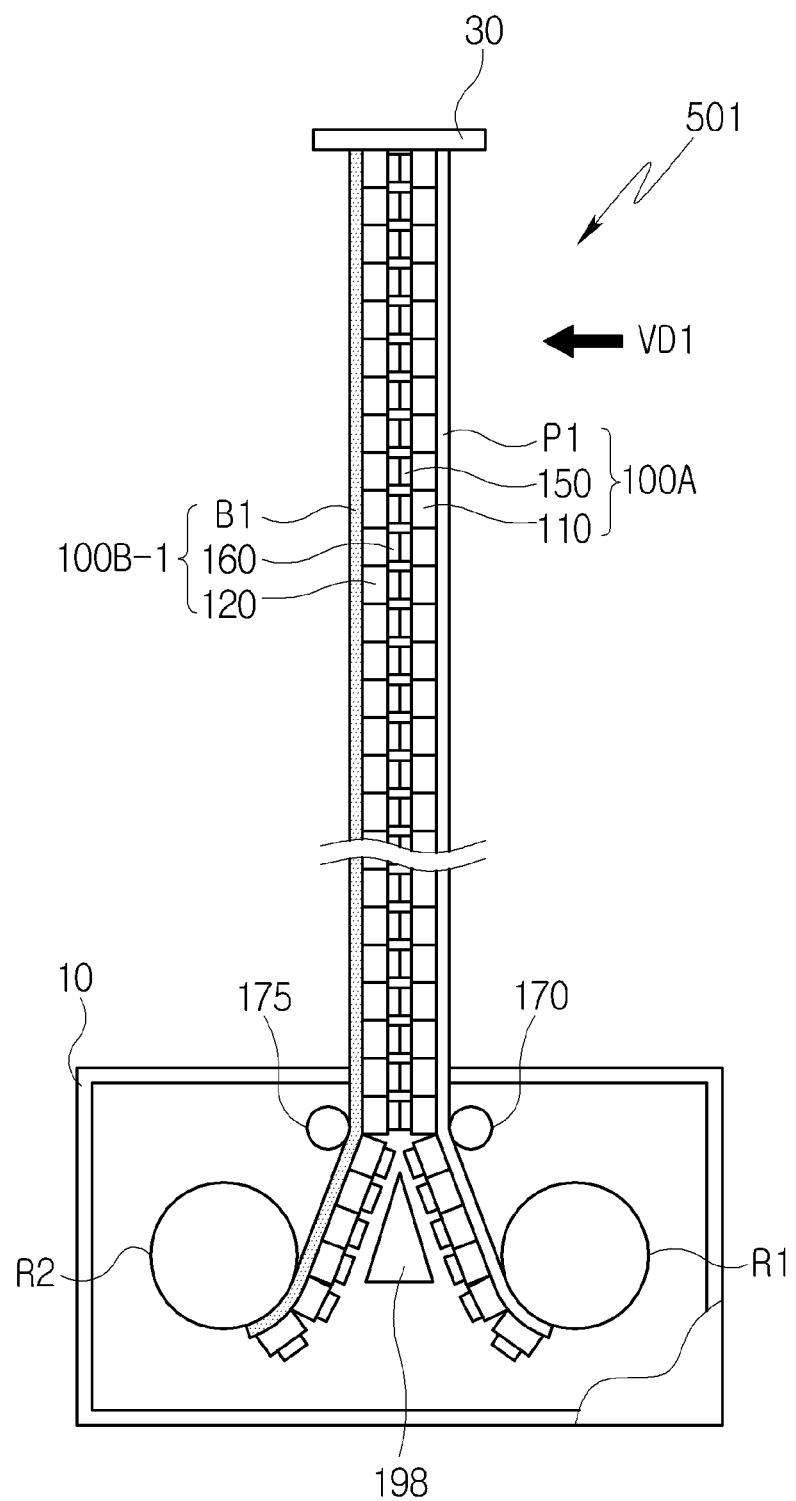

[FIG. 11A]
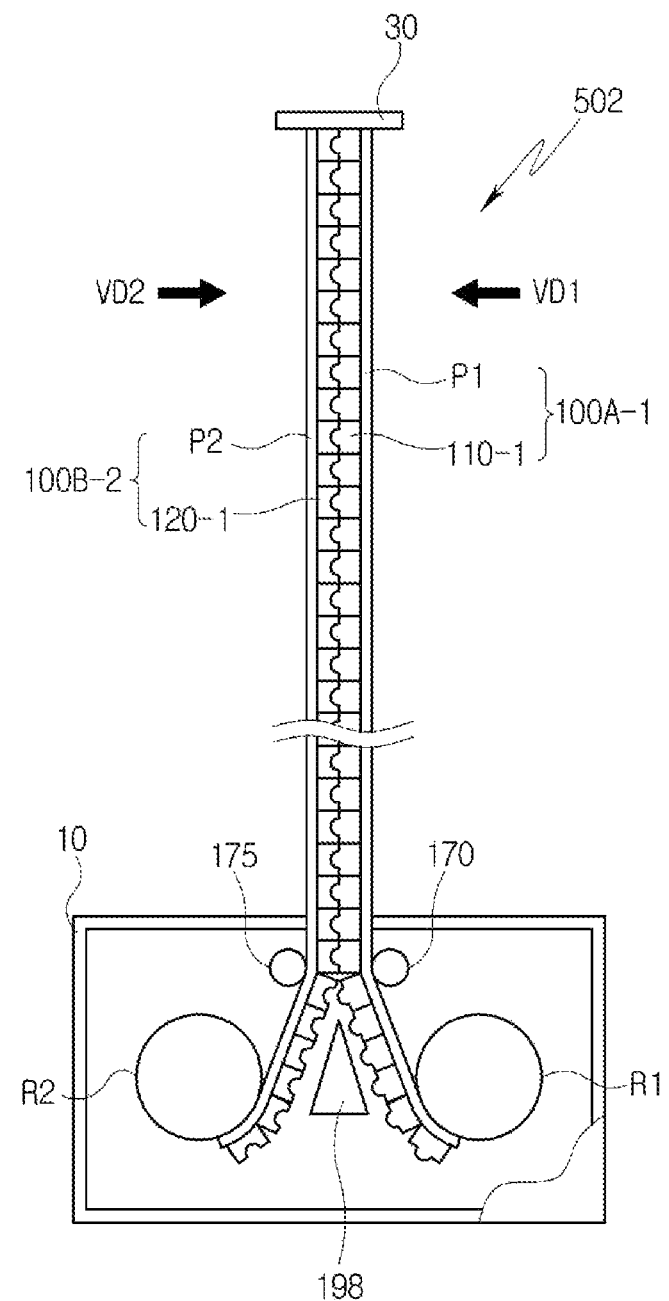

[FIG. 11B]
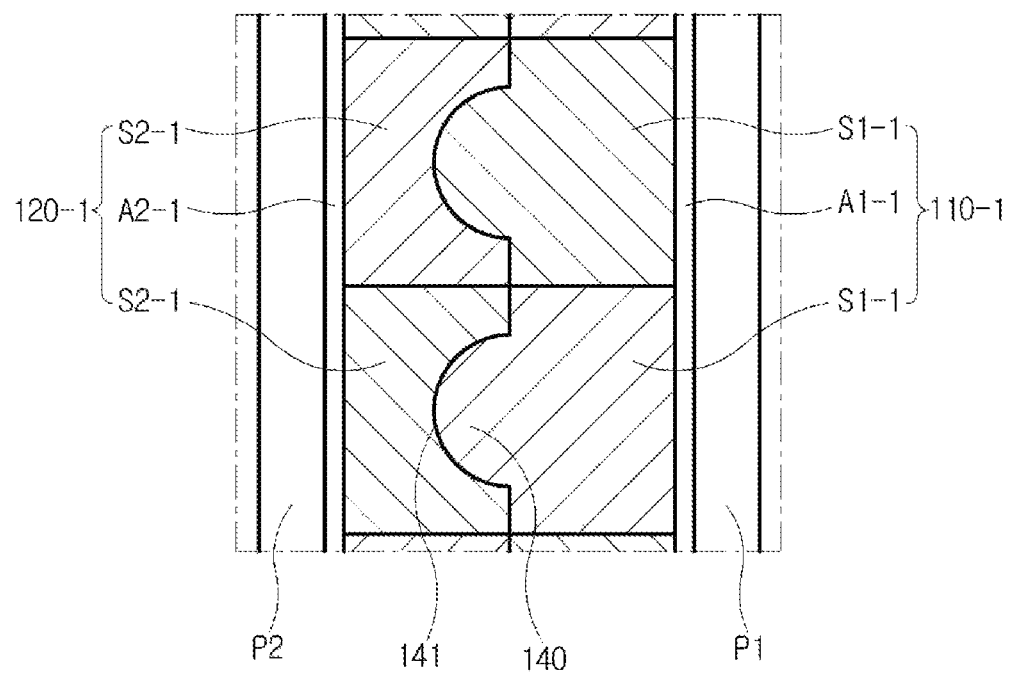

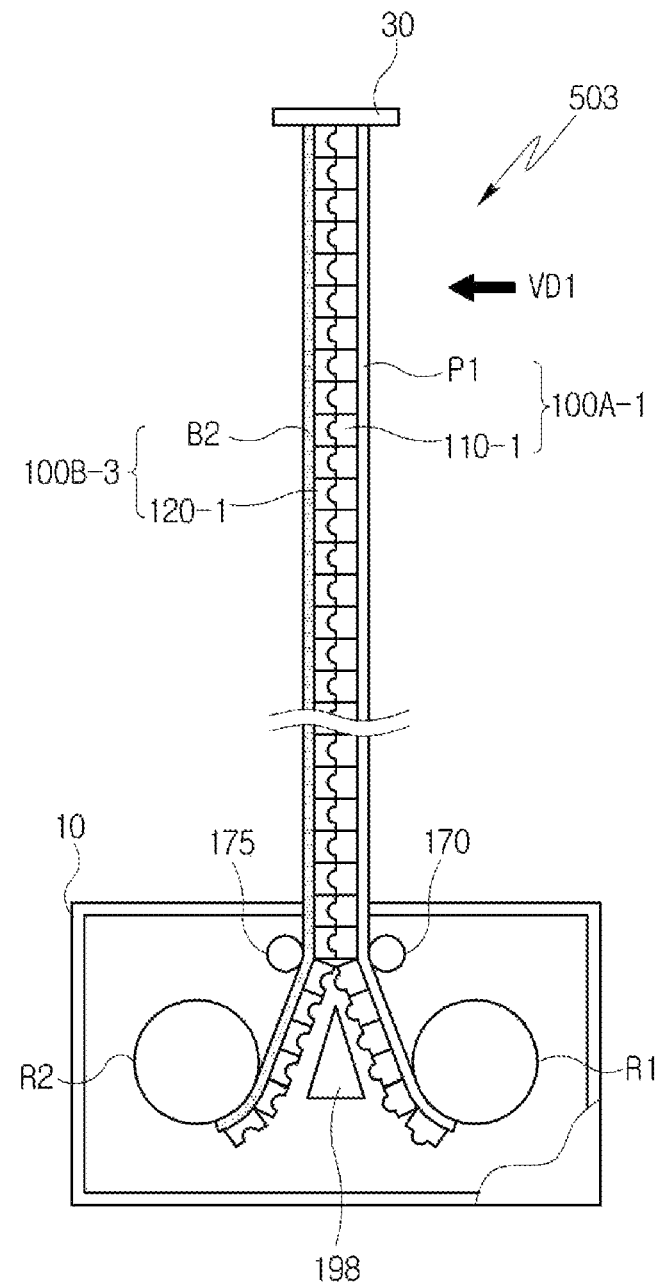
[FIG. 12]

ROLLABLE DISPLAY DEVICE

CROSS-REFERENCE TO RELATED APPLICATIONS

This application claims priority to Republic of Korea Patent Application No. 10-2018-0089571, filed on Jul. 31, 2018, which is incorporated herein by reference in its entirety.

BACKGROUND OF THE DISCLOSURE

Field of the Disclosure

The present disclosure relates to a rollable display device, and more particularly, to a rollable display device having a structure in which a flexible display panel is wound or unwound by a roller.

Description of the Related Art

In recent years, various types of flexible display devices have been developed in order to enhance convenience for the use of the user. Generally, such a flexible display device is being developed as a portable display device, and the flexible display device includes a display panel having flexible characteristics.

The flexible display device includes a foldable display device and a rollable display device that enhance the portability of the user. The foldable display device has a structural characteristic in which a part of the flexible display panel is folded, and the rollable display device has a structural characteristic in which the flexible display panel is wound around or unwound from the roller.

SUMMARY OF THE DISCLOSURE

An object of the present disclosure is to provide a rollable display device having a structure in which a flexible display panel can be more stably supported when the flexible display panel is unwound by a roller.

In one embodiment, a rollable display device includes a first roller part, a second roller part, a first assembly, and a second assembly. The first roller part and the second roller part face each other. The first assembly is configured to be wound around the first roller part or unwound from the first roller part. The second assembly is configured to be wound around the second roller part or unwound from the second roller part to be opposite to the first assembly.

The first assembly includes a first flexible display panel and a first support structure body. The first support structure body has a plurality of support elements, and the first support structure body is coupled to the back surface of the first flexible display panel to support the first flexible display panel.

The second assembly includes a second support structure body. The second support structure body has a plurality of support elements, and the second support structure body is coupled to the first support structure body by magnetic force to support the first flexible display panel.

In another embodiment, a rollable display device includes a first roller part, a second roller part, a first assembly, and a second assembly. The first roller part and the second roller part face each other. The first assembly is configured to be wound around the first roller part or unwound from the first roller part. The second assembly is configured to be wound around the second roller part or unwound from the second roller part to be opposite to the first assembly.

The first assembly includes a first flexible display panel and a first support structure body. The first flexible display panel displays an image. The first support structure body includes a plurality of first support elements, and the first support structure body is coupled to the back surface of the first flexible display panel to support the first flexible display panel.

The second assembly includes a second support structure body. The second support structure body includes a plurality of second support elements coupled with the plurality of first support elements to support a second flexible display panel. In this embodiment, an interface between the first support elements and the second support elements may be uneven

BRIEF DESCRIPTION OF THE DRAWINGS

FIG. 1 is a perspective view of a rollable display device according to an embodiment of the present disclosure.

FIG. 2 is a front view illustrating a first assembly of the rollable display device illustrated in FIG. 1.

FIG. 3 is a front view illustrating a second assembly of the rollable display device illustrated in FIG. 1.

FIG. 4 is a plan view of the rollable display device illustrated in FIG. 1.

FIG. 5A is a rear view of the first assembly in a state where the first assembly has been separated from the rollable display device illustrated in FIG. 4.

FIG. 5B is an enlarged view of a portion of FIG. 5A.

FIG. 6 is a rear view of the second assembly in a state where the second assembly has been separated from the rollable display device illustrated in FIG. 4.

FIG. 7 is another plan view of the rollable display device illustrated in FIG. 4.

FIG. 8 illustrates the flexible characteristic of the first assembly illustrated in FIG. 7.

FIG. 9 illustrates the flexible characteristic of the second assembly illustrated in FIG. 7.

FIG. 10 is a plan view of the rollable display device according to another embodiment of the present disclosure.

FIG. 11A is a plan view of the rollable display device according to still another embodiment of the present disclosure.

FIG. 11B is an enlarged view of portions of the first assembly and the second assembly coupled to each other illustrated in FIG. 11A.

FIG. 12 is a plane view of the rollable display device according to yet another embodiment of the present disclosure.

DESCRIPTION OF SPECIFIC EMBODIMENTS

Hereinafter, embodiments of the present disclosure will be described in detail with reference to the accompanying drawings. The above objects, features, and advantages of the present disclosure will be understood through the following embodiments with reference to the accompanying drawings. However, the present disclosure is not limited to the embodiments disclosed herein and can be modified in various forms. The embodiments of the present disclosure, which will be described below, are provided to clarify the technical spirit of the present disclosure and also to fully transfer the technical spirit thereof to those skilled in the art to which the present disclosure pertains. Therefore, the scope of the present disclosure should not be construed as being limited to embodiments which will be described below. In the following embodiments and the drawings, the same reference numerals denote the same components.

In addition, throughout this disclosure, terms such as a "first," "second," and the like are used not for limitative but for the purpose of distinguishing one component from another component. In addition, when a portion of a film, a region, a component, or the like is referred to as being "on" another portion, this includes not only a case in which the portion is "directly on" another portion but also a case in which another film, another region, another component, or the like is interposed between the portion and another portion.

FIG. 1 is a perspective view of a rollable display device 300 according to an embodiment of the present disclosure. In addition, FIG. 2 is a front view illustrating a first assembly 100A of the rollable display device 300 illustrated in FIG. 1, and FIG. 3 is a front view illustrating a second assembly 100B of the rollable display device 300 illustrated in FIG. 1. More specifically, FIG. 2 is a front view illustrating when viewing the rollable display device 300 in a first viewing direction VD1 illustrated in FIG. 1, and FIG. 3 is a front view illustrating when viewing the rollable display device 300 in a second viewing direction VD2 illustrated in FIG. 1.

Referring to FIGS. 1, 2, and 3, the rollable display device 300 includes a housing 10, a first roller part R1, a second roller part R2, the first assembly 100A, the second assembly 100B, and a guide 30.

Inside the housing 10, the first roller part R1 and the second roller part R2 are received, the first roller part R1 is connected to the first assembly 100A, and the second roller part R2 is connected to the second assembly 100B. In addition, an opening 20 is defined in the housing 10, and the first and second assemblies 100A, 100B connected to the first and second roller parts R1, R2 are drawn out of the housing 10 through the opening 20.

Therefore, the first and second assemblies 100A, 100B are received inside the housing 10 in a state where the first and second assemblies 100A, 100B have been wound around the first and second roller parts R1, R2. In addition, when the first and second assemblies 100A, 100B are unwound from the first and second roller parts R1, R2, the first and second assemblies 100A, 100B can be drawn out of the housing 10 through the opening 20.

The first roller part R1 is coupled with the end portion of the first assembly 100A to wind or unwind the first assembly 100A. In this embodiment, the rolling operation of the first roller part R1 can be performed by a rotational force generated from a motor (not illustrated) received inside the housing 10. Therefore, when the first roller part R1 rotates in a first rotation direction by the motor, the first roller part R1 can perform the operation of winding the first assembly 100A, and when the first roller part R1 rotates in a second rotation direction opposite to the first rotation direction by the motor, the first roller part R1 can perform the operation of unwinding the first assembly 100A.

The second roller part R2 is coupled with the end portion of the second assembly 100B to wind or unwind the second assembly 100B. In this embodiment, the rolling operation of the second roller part R2 can be performed by a rotational force generated from a motor (not illustrated) received inside the housing 10. The second roller part R2 is disposed to face the first roller part R1 inside the housing 10. The second roller part R2 can perform an operation of winding and unwinding the second assembly 100B by a rotational force received from the motor.

One end portion of the first assembly 100A is fixed to the first roller part R1, and the other end portion of the first assembly 100A is fixed to the guide 30. The first assembly 100A is wound around the first roller part R1, or the first assembly 100A is unwound from the first roller part R1.

In this embodiment, the first assembly 100A includes a first flexible display panel (P1 in FIG. 4) having a first display screen DA1. Therefore, the first assembly 100A displays an image through the first display screen DA1 in a first viewing direction VD1.

One end portion of the second assembly 100B is fixed to the second roller part R2, and the other end portion of the second assembly 100B is fixed to the guide 30. The second assembly 100B is wound around the second roller part R2 or the second assembly 100B is unwound from the second roller part R2.

In this embodiment, the second assembly 100B includes a second flexible display panel (P2 in FIG.) having a second display screen DA2. Therefore, the second assembly 100B displays an image through the second display screen DA2 in a second viewing direction VD2.

The guide 30 is coupled with the first and second assemblies 100A, 100B. In this embodiment, the guide 30 can be received in the opening 20 to be coupled to the housing 10 in a state where the first and second assemblies 100A, 100B are maximally wound around the first and second roller parts R1, R2.

The first assembly 100A includes the first flexible display panel (P1 in FIG. 4), and the second assembly 100B includes the second flexible display panel (P2 in FIG. 4). In this embodiment, the first and second flexible display panels of the first and second assemblies 100A, 100B display different images through the first and second display screens DA1, DA2. Therefore, a plurality of users watch different images in the first and second viewing directions VD1, VD2, or one user can also rotate the rollable display device 300 to selectively watch the first display screen DA1 or the second display screen DA2.

Meanwhile, in addition to the display functions of the above-described first and second assemblies 100A, 100B, in this embodiment, the first and second assemblies 100A, 100B have a structure of supporting the first and second flexible display panels (P1, P2 in FIG. 4) having the first and second display screens DA1, DA2. This will be described as follows.

FIG. 4 is a plan view of a rollable display device 500 illustrated in FIG. 1, FIG. 5A is a rear view of the first assembly 100A in a state where the first assembly 100A has been separated from the rollable display device illustrated in FIG. 4, and FIG. 5B is an enlarged view of a portion of FIG. 5A.

Meanwhile, it has been illustrated in FIG. 4 that the cover portion of the housing 10 is omitted in order to illustrate the components received inside the housing 10, and it has been illustrated in FIG. 5B that portions of the first and second assemblies 100A, 100B disposed outside the housing 10 are enlarged.

Referring to FIGS. 4, 5A, and 5B, in this embodiment, the first assembly 100A includes the first flexible display panel P1, a first support structure body 110, and a first magnet structure body 150.

The first flexible display panel P1 displays an image through the first display screen (DA1 in FIG. 2). The first flexible display panel P1 has the characteristic that can be flexibly bent, and the first flexible display panel P1 can be configured to be wound around the first roller part R1 or unwound from the first roller part R1.

In this embodiment, the first flexible display panel P1 can be an organic electroluminescence display panel. In this case, the first flexible display panel P1 can include a base board and a plurality of pixels arranged on the base board in a matrix shape, and the base board can be a polymer film having flexible characteristics. In addition, each of the plurality of pixels includes an anode, an organic light emitting layer disposed on the anode to emit light, and a cathode disposed on the organic light emitting layer. Therefore, the first flexible display panel P1 displays an image by using the light output from the plurality of pixels.

The first support structure body 110 has a plurality of divided structures. The first support structure body 110 is coupled to the back surface of the first flexible display panel P1 to support the back surface of the first flexible display panel P1. Therefore, it is possible to enhance the mechanical strength and degree of flatness of the first flexible display panel P1 by the first support structure body 110, and to enhance the characteristic of keeping a state where the first flexible display panel P1 has been spread by the first support structure body 110, so-called the standing characteristic.

In this embodiment, the first support structure body 110 can include a plurality of first support elements S1. Each of the plurality of first support elements S1 can have a bar shape extending in the first direction DR1, and the plurality of first support elements S1 can be arranged in the second direction DR2 perpendicular to the first direction DR1. In this embodiment, the constituent material of the plurality of first support elements S1 can contain aluminum, and each of the plurality of first support elements S1 can be hollow in order to reduce the weight of the first support structure body 110.

In this embodiment, a first double-sided adhesive layer A1 can be interposed between each of the plurality of first support elements S1 and the first flexible display panel P1, and the first support structure body 110 composed of the plurality of first support elements S1 can be coupled to the first flexible display panel P1 by the adhesive force of the first double-sided adhesive layer A1.

In this embodiment, two first support elements S1 adjacent to each other among the plurality of first support elements D1 can substantially contact each other in a state where the first flexible display panel P1 has been spread in a substantially flat state. In another embodiment, the plurality of first support elements D1 can be arranged to be spaced at a certain interval apart from each other, and in this case, the interval at which the plurality of first support elements S1 have been spaced apart from each other can be smaller than the width of each of the plurality of first support elements S1.

The first magnet structure body 150 has a plurality of divided structures, and the first magnet structure body 150 is coupled to the back surface of the first support structure body 110. In this embodiment, the first magnet structure body 150 can include a plurality of first magnet elements M1. A second double-sided adhesive layer A2 can be interposed between each of the plurality of first magnet elements M1 and the first support structure body 110, and the first magnet structure body 150 composed of the plurality of first magnet elements M1 can be coupled to the first support structure body 110 by the adhesive force of the second double-sided adhesive layer A2.

In this embodiment, each of the plurality of first magnet elements M1 can have a bar shape extending in the first direction DR1, and the plurality of first magnet elements M1 can be arranged in the second direction DR2. In addition, the size of each of the plurality of first magnet elements M1 can be smaller than the size of each of the plurality of first support elements S1, and two first magnet elements M1 adjacent to each other among the plurality of first magnet elements M1 can be spaced apart from each other, thereby reducing the degree where a magnetic force generated between the two first magnet elements M1 adjacent to each other affects the two first magnet elements M1 adjacent to each other.

As described above, in this embodiment, each of the plurality of first magnet elements M1 has a bar shape, but the present disclosure is not limited to the shape of each of the plurality of first magnet elements M1. For example, in another embodiment, each of the plurality of first magnet elements M1 can be implemented as magnetic dots arranged on any one of the first support elements S1, and in this case, the magnetic dots can also be selectively provided to both end portions of the first support element S1.

Meanwhile, in other embodiments of the present disclosure, the first and second support structure bodies 110, 120 can be coupled by the magnetic force according to the following configurations. For example, the first and second magnet structure bodies 150, 160 can be omitted, and instead, the first and second support structure bodies 110, 120 can be implemented as a magnet so that the first and second support structure bodies 110, 120 can be coupled to each other by the magnetic force generated between the first and second support structure bodies 110, 120. For another example, the second magnet structure body 160 can be omitted, and the second magnet structure body 160 can be replaced with a metal structure that responds to the magnetic force, and in this case, the first and second support structure bodies 110, 120 can be coupled by the magnetic force generated between the first magnet structure body 150 and the metal structure.

Hereinafter, a structure of the second assembly 100B will be described further with reference to FIGS. 4, 5B, and 6 as follows.

FIG. 6 is a rear view of the second assembly 100B in a state where the second assembly 100B has been separated from the rollable display device illustrated in FIG. 4.

Referring to FIGS. 4, 5B, and 6, a position of the second assembly 100B in the rollable display device 500 is different from a position of the first assembly 100A, but the structure of the second assembly 100B can be similar to the structure of the first assembly 100A, such that the structure of the second assembly 100B will be briefly described.

In this embodiment, the second assembly 100B includes the second flexible display panel P2, the second support structure body 120, and the second magnet structure body 160.

The second flexible display panel P2 displays an image through the second display screen (DA2 in FIG. 3). In addition, the second flexible display panel P2 has the characteristic that it can be flexibly bent, and the second flexible display panel P2 can be configured to be wound around the second roller part R2 or unwound from the second roller part R2.

In this embodiment, like the first flexible display panel P1, the second flexible display panel P2 can be an organic electroluminescence display panel.

The second support structure body 120 has a plurality of divided structures. The second support structure body 120 is coupled to the back surface of the second flexible display panel P2 to support the back surface of the second flexible display panel P2. Therefore, it is possible to enhance the mechanical strength, flatness degree, and standing characteristic of the second flexible display panel P2 by the second support structure body 120.

In this embodiment, the second support structure body 120 can include a plurality of second support elements S2. Each of the plurality of second support elements S2 can have a bar shape extending in the first direction DR1, and the plurality of second support elements S2 can be arranged in the second direction DR2. In this embodiment, the constituent material of the plurality of second support elements S2 can contain aluminum, and each of the plurality of second support elements S2 can have a hollow shape.

In this embodiment, a third double-sided adhesive layer A3 can be interposed between each of the plurality of second support elements S2 and the second flexible display panel P2, and the second support structure body 120 composed of the plurality of second support elements S2 can be coupled to the second flexible display panel P2 by the adhesive force of the third double-sided adhesive layer A3.

In this embodiment, the two second support elements S2 adjacent to each other among the plurality of second support elements S2 can substantially contact each other in a state where the second flexible display panel P2 has been spread in a substantially flat state, and in another embodiment, the plurality of second support elements S2 can be arranged to be spaced at a certain interval apart from each other.

The second magnet structure body 160 has a plurality of divided structures, and the second magnet structure body 160 is coupled to the back surface of the second support structure body 120. In this embodiment, the second magnet structure body 160 can include a plurality of second magnet elements M2. A fourth double-sided adhesive layer A4 can be interposed between each of the plurality of second magnet elements M2 and the second support structure body 120, and the second magnet structure body 160 composed of the plurality of second magnet elements M2 can be coupled to the second support structure body 120 by the adhesive force of the fourth double-sided adhesive layer A4.

In this embodiment, each of the plurality of second magnet elements M2 can have a bar shape extending in the first direction DR1, and the plurality of second magnet elements M2 can be arranged in the second direction DR2. In addition, the plurality of second magnet elements M2 can be arranged to be spaced at a certain interval apart from each other.

Meanwhile, as illustrated in FIG. 4, the first assembly 100A and the second assembly 100B are coupled to each other by the guide 30 outside the housing 10. More specifically, when the first assembly 100A and the second assembly 100B are disposed outside the housing 10, the first magnet structure body 150 faces the second magnet structure body 160 to be coupled with the second magnet structure body 160 by the magnetic force, and as a result, the first assembly 100A is coupled to the second assembly 100B.

In this embodiment, when the first and second magnet structure bodies 150, 160 are coupled to each other by the magnetic force, the plurality of first magnet elements M1 of the first magnet structure body 150 are coupled by the magnetic force to have one-to-one correspondence with the plurality of second magnet elements M2 of the second magnet structure body 160. For example, one first magnet element of the plurality of first magnet elements M1 is coupled by the magnetic force to the corresponding second magnet element of the plurality of second magnet elements M2, and in this case, the surface exposed to the outside of the first magnet element can have an N pole, and the surface exposed to the outside of the second magnet element can have an S pole.

According to the above-described configuration of the first and second assemblies 100A, 100B, when the first and second assemblies 100A, 100B are disposed outside the housing 10, the first and second assemblies 100A, 100B become one integrated structure so that the first and second support structure bodies 110, 120 can be interposed between the first and second flexible display panels P1, P2. Therefore, the first flexible display panel P1 can be supported by the second support structure body 120 as well as the first support structure body 110 and the second flexible display panel P2 can be supported by the first support structure body 110 as well as the second support structure body 120, thereby enhancing the standing characteristic of the first and second flexible display panels P1, P2 by the first and second support structure bodies 110, 120.

FIG. 7 is another plan view of the rollable display device 500 illustrated in FIG. 4. More specifically, FIG. 4 illustrates a state where the first and second assemblies (100A, 100B in FIG. 4) has been unwound by the first and second roller parts (R1, R2 in FIG. 4), and FIG. 7 illustrates a state where the first and second roller parts R1, R2 has partially wound the first and second assemblies 100A, 100B.

Referring to FIG. 7, in this embodiment, the first roller part R1, the second roller part R2, a first guide roller 170, a second guide roller 175, and a guide block 198 are received inside the housing 10.

As described above, the first roller part R1 winds or unwinds the first assembly 100A, and the second roller part R2 winds or unwinds the second assembly 100B. For example, when comparing the first and second roller parts illustrated in FIG. 4 (R1, R2 in FIG. 4) and the first and second roller parts illustrated in FIG. 7 (R1, R2 in FIG. 7), the first roller part R1 rotates counterclockwise so that a part of the first assembly 100A can be wound around the first roller part R1, and the second roller part R2 rotates clockwise so that a part of the second assembly 100B can be wound around the second roller part R2 in FIG. 7.

The first guide roller 170 and the second guide roller 175 are received to face each other inside the housing 10, and the interval between the first and second guide rollers 170, 175 is smaller than the interval between the first and second roller parts R1, R2 inside the housing 10. The first guide roller 170 guides the operation of winding the first assembly 100A to the first roller part R1 by rolling the first assembly 100A inside the housing 10, and the second guide roller 175 guides the operation of winding the second assembly 100B to the second roller part R2 by rolling the second assembly 100B inside the housing 10.

The guide block 198 is received inside the housing 10. The guide block 198 is disposed between a portion of the first assembly 100A wound around the first roller part R1 and a portion of the second assembly 100B wound around the second roller part R2. In this embodiment, the angled portion of the guide block 198 is disposed between the first assembly 100A and the second assembly 100B to guide an operation in which the first and second assemblies 100A, 100B are separated from each other inside the housing 10, thereby preventing the first and second assemblies 100A, 100B separated from each other by the guide block 198 from being re-coupled to each other again by the magnetic force.

Meanwhile, as illustrated in FIG. 4, in a state where the first and second assemblies (100A, 100B in FIG. 4) have been unwound from the first and second roller parts (R1, R2 in FIG. 4), when the first roller part R1 rotates counterclockwise and the second roller part R2 rotates clockwise, the operation of winding the first assembly 100A around the first roller part R1 is started, and the operation of winding the second assembly 100B around the second roller part R2 is started.

In this embodiment, the interval that the first and second roller parts R1, R2 are spaced apart from each other is larger than the sum of the thickness of the first assembly 100A and the thickness of the second assembly 100B. Therefore, the operation of winding the first and second assemblies 100A, 100B around the first and second roller parts R1, R2 is started, and at the same time, the separation between the first and second assemblies 100A, 100B adjacent to the first and second roller parts R1, R2 is started.

Before the separation between the first and second assemblies 100A, 100B is started, as described above, the first and second assemblies 100A, 100B are temporarily coupled by the magnetic force acting between the first and second magnet structure bodies 150, 160. However, when the forces acting on the first and second assemblies 100A, 100B in different directions act by the rotation of the first and second roller parts R1, R2, the coupling between the first and second magnet structure bodies 150, 160 by the magnetic force can be released, and the first and second assemblies 100A, 100B can be wound around the first and second roller parts R1, R2, respectively.

In addition, when the first roller part R1 rotates clockwise and the second roller part R2 rotates counterclockwise, the first assembly 100A wound around the first roller part R1 is unwound, and the second assembly 100B wound around the second roller part R2 is unwound, and at the same time, the first and second assemblies 100A, 100B spaced apart from each other are collected between the first and second guide rollers 170, 175. In addition, the first and second magnet structure bodies 150, 160 are coupled to each other by the magnetic force between the first and second guide rollers 170, 175, and as a result, the first and second assemblies 100A, 100B can be coupled to each other and drawn out of the housing 10.

FIG. 8 is illustrates the flexible characteristic of the first assembly 100A illustrated in FIG. 7, and FIG. 9 illustrates the flexible characteristic of the second assembly 100B illustrated in FIG. 7.

Referring to FIG. 8, as described above, the plurality of first support elements S1 of the first support structure body 110 are substantially arranged to contact each other on the first flexible display panel P1. When a force is applied to the first assembly 100A in the first direction RD1, the plurality of first support elements S1 contact each other so that the first flexible display panel P1 of the first assembly 100A is not bent by a support force generated from the plurality of first support elements S1. Therefore, the first flexible display panel P1 can have the standing characteristic with respect to the force acting in the first direction RD1.

On the contrary, when a force is applied to the first assembly 100A in the second direction RD2 by the rotation of the first roller part (R1 in FIG. 7), the interval between the plurality of first support elements S1 can be widening. Therefore, when the force in the second direction RD2 acts on the first assembly 100A, the plurality of first support elements S1 do not hinder the bending operation of the first assembly 100A, such that the first flexible display panel P1 of the first assembly 100A can have the flexible characteristic with respect to the force acting in the second direction RD2.

Referring to FIG. 9, the plurality of second support elements S2 of the second support structure body 120 are arranged to contact each other on the second flexible display panel P2. Therefore, like the plurality of first support elements (S1 in FIG. 8) of the first support structure body (110 in FIG. 8) described with reference to FIG. 8, the second flexible display panel P2 can have the standing function by the force acting in the second direction RD2.

In addition, when a force acts on the second assembly 100B in the first direction RD1 by the rotation of the second roller part (R2 in FIG. 7), like the plurality of first support elements (S1 in FIG. 8) of the first support structure body (110 in FIG. 8) described with reference to FIG. 8, the second flexible display panel P2 of the second assembly 100B can have the flexible characteristic with respect to the force acting in the first direction RD1.

Therefore, when the first and second assemblies 100A, 100B are disposed outside the housing (10 in FIG. 7), it is possible to easily keep a state where the first and second flexible display panels P1, P2 have been spread by the standing characteristic of the first and second assemblies 100A, 100B. In addition, when the first and second assemblies 100A, 100B are disposed inside the housing (10 in FIG. 7), it is possible to easily keep a state where the first and second assemblies 100A, 100B have been wound around the first and second roller parts (R1, R2 in FIG. 7) by the flexible characteristic of the first and second assemblies 100A, 100B.

FIG. 10 is a plan view of a rollable display device 501 according to another embodiment of the present disclosure. Meanwhile, in the description of FIG. 10, the above-described components are denoted by the same reference numerals, and redundant description of the components is omitted.

Referring to FIG. 10, the rollable display device 501 includes the first assembly 100A and a second assembly 100B-1.

When comparing the structure of the embodiment illustrated in FIG. 4 with the structure of the embodiment illustrated in FIG. 10, the second assembly (100B in FIG. 4) of the rollable display device (500 in FIG. 4) illustrated in FIG. 4 include the second flexible display panel (P2 in FIG. 4), and on the contrary, in the embodiment illustrated in FIG. 10, the second assembly 100B-1 of the rollable display device 501 includes a base board B1 instead of the flexible display panel.

In this embodiment, the base board B1 can be a film having the flexible characteristic such as a Polyethylene terephthalate (PET) film. An adhesive layer is interposed between the base board B1 and the second support structure body 120 so that the second support structure body 120 can be coupled to the base board B1.

According to a configuration of the above-described rollable display device 501, the first flexible display panel P1 provided in the first assembly 100A displays an image in the first viewing direction VD1, and the second assembly 100B-1 support the first flexible display panel P1 of the first assembly 100A.

That is, in this embodiment, the flexible display panel has been omitted from the components of the second assembly 100B-1, and it can be an embodiment suitable for implementing one display screen in the rollable display device 501. In addition, as in the embodiment described above with reference to FIG. 4, it is possible to enhance the standing function of the first flexible display panel P1 of the rollable display device 501 by the configuration of the second assembly 100B-1 even in this embodiment.

FIG. 11A is a plan view of the rollable display device 502 according to still another embodiment of the present disclosure, and FIG. 11B is an enlarged view of portions of the first assembly 100A-1 and the second assembly 100B-2 coupled to each other illustrated in FIG. 11A. Meanwhile, in the description of FIGS. 11A and 11B, the above-described components are denoted by the same reference numerals, and redundant description of the components is omitted.

Referring to FIGS. 11A and 11B, a rollable display device 502 includes a first assembly 100A-1 and a second assembly 100B-2. In addition, the first assembly 100A-1 includes the first flexible display panel P1 and a first support structure body 110-1, and the second assembly 100B-2 includes the second flexible display panel P2 and a second support structure body 120-1. The rollable display device 502 displays an image in the first viewing direction VD1 through the first flexible display panel P1, and the rollable display device 502 displays an image in the second viewing direction VD2 through the second flexible display panel P2.

A comparison between the embodiment illustrated in FIG. 4 and the embodiment illustrated in FIGS. 11A and 11B is as follows.

In the embodiment illustrated in FIG. 4, the first and second assemblies (100A, 100B in FIG. 4) of the rollable display device (500 in FIG. 4) are coupled by the magnetic force generated between the first and second magnet structure bodies (150, 160 in FIG. 4). On the contrary, in the embodiment illustrated in FIGS. 11A and 11B, the magnet structure bodies are omitted from the first and second assemblies 100A-1, 100B-2, and the first and second assemblies 100A-1, 100B-2 are rather coupled to each other by structural coupling between the first and second support structure bodies 110-1, 120-1.

The first support structure body 110-1 is coupled to the back surface of the first flexible display panel P1 by a first adhesive layer A1-1, and the first support structure body 110-1 includes a plurality of first support elements S1-1. In addition, the second support structure body 120-1 is coupled to the back surface of the second flexible display panel P2 by a second adhesive layer A2-1, and the second support structure body 120-1 includes a plurality of second support elements S2-1.

The plurality of first support elements S1-1 can couple the plurality of second support elements S2-1 with an uneven structure. In other words, an interface between the first support elements S1-1 and the second support elements S2-1 may be uneven. In this embodiment, each of the plurality of first support elements S1-1 includes a protrusion 140, and each of the plurality of second support elements S2-1 has a receiving groove 141 for receiving the corresponding protrusion 140.

Therefore, in a state where the first and second support structure bodies 110-1, 120-1 have been drawn out of the housing 10, the plurality of first support elements S1-1 and the plurality of second support elements S2-1 are coupled in an uneven structure so that each of the first and second flexible display panels P1, P2 can be supported by the first and second support structure bodies 110-1, 120-1. As a result, it is possible to enhance the standing characteristic of each of the first and second flexible display panels P1, P2 by the first and second support structure bodies 110-1, 120-1.

Meanwhile, in a state where the first and second assemblies 100A-1, 100B-2 have been drawn out of the housing 10, when the first and second roller parts R1, R2 rotate to start an operation of winding the first and second assemblies 100A-1, 100B-2, the pointed portion of the guide block 198 is disposed between the first and second assemblies 100A-1, 100B-2, such that the coupling by the uneven structure of the first and second support structure bodies 110-1, 120-1 can be easily separated from each other, and the first and second support structure bodies 110-1, 120-1 separated from each other can be prevented from being re-coupled to each other by the guide block 198.

In addition, when the first and second roller parts R1, R2 are rotated to start the operation of unwinding the first and second assemblies 100A-1, 100B-2, as the first and second assemblies 100A-1, 100B-2 separated from each other pass between the first and second guide rollers 170, 175, the coupling by the uneven structure of the first and second support structure bodies 110-1, 120-1 is implemented so that the first and second assemblies 100A-1, 100B-2 can be coupled to each other.

FIG. 12 is a plan view of a rollable display device 503 according to yet another embodiment of the present disclosure. In the description of FIG. 12, the above-described components are denoted by the same reference numerals, and redundant description of the components is omitted.

When comparing the embodiment illustrated in FIG. 11A with the embodiment illustrated in FIG. 12, the second assembly (100B-2 in FIG. 11A) of the rollable display device (502 in FIG. 11A) illustrated in FIG. 11 includes the second flexible display panel (P2 in FIG. 11A), and on the contrary, in the embodiment illustrated in FIG. 12, a second assembly 100B-3 of the rollable display device 503 includes a base board B2 instead of the flexible display panel.

In this embodiment, the base board B2 can be a film having the flexible characteristic such as a Polyethylene terephthalate (PET) film. An adhesive layer is interposed between the base board B2 and the second support structure body 120-1 so that the second support structure body 120-1 can be coupled to the base board B2.

According to the above-described configuration of the rollable display device 503, the first flexible display panel P1 provided in the first assembly 100A-1 displays an image in the first viewing direction VD1, and the second assembly 100B-3 supports the first flexible display panel P1 of the first assembly 100A-1.

That is, in the embodiment illustrated in FIG. 12 as compared to the embodiment illustrated in FIG. 11, the flexible display panel has been omitted from the components of the second assembly 100B-3, and can be an embodiment suitable for implementing one display screen in the rollable display device 503. In addition, as in the embodiment described above with reference to FIG. 11A, it is possible to enhance the standing function of the first flexible display panel P1 of the rollable display device 503 by the configuration of the second assembly 100B-3 even in this embodiment.

According to an embodiment of the present disclosure, the assemblies wound around the roller parts include the flexible display panels, the magnet structure bodies, and the support structure bodies. According to this configuration, when the unwinding operation of the roller parts is performed and the assemblies are disposed outside the housing, the support structure bodies are interposed between the display panels, and the support structure bodies are coupled by the magnet structure bodies. Therefore, although separate link frames for supporting the back surfaces of the flexible display panels are not provided, it is possible to enhance the mechanical strength and flatness degree of the flexible display panels by the force at which the support structure bodies support the flexible display panels, and as a result, to enhance the standing characteristic that keeps the spread state of the flexible display panels outside the housing.

According to another embodiment of the present disclosure, the assemblies wound around the roller parts include the flexible display panels and the support structure bodies coupled to each other in the uneven structure. According to this configuration, when the unwinding operation of the roller parts is performed and the assemblies are disposed outside the housing, the support structure bodies coupled to each other in the uneven structure are interposed between the display panels. Therefore, although separate link frames for supporting the back surfaces of the flexible display panels are not provided, it is possible to enhance the standing characteristic that keeps the spread state of the flexible display panels outside the housing by using a structure of the support structure bodies.

As described above, although the present disclosure has been described with reference to the limited embodiments and drawings, it should be understood that the present disclosure is not limited thereto and various modifications and deformations can be made by those skilled in the art to which the present disclosure pertains within the technical spirit of the present disclosure and the equivalent scope of the appended claims.

What is claimed is:

1. A rollable display device, comprising:
 a first roller part;
 a second roller part facing the first roller part;
 a first assembly configured to be wound around the first roller part or unwound from the first roller part; and
 a second assembly configured to be wound around the second roller part or unwound from the second roller part, the second assembly disposed to be opposite to the first assembly,
 wherein the first assembly comprises:
 a first flexible display panel; and
 a first support structure body having a plurality of first support elements, each first support element extending in a first direction to be arranged in a second direction intersecting the first direction, wherein the first support structure body is coupled to a back surface of the first flexible display panel to support the first flexible display panel, and
 wherein the second assembly comprises:
 a second support structure body having a plurality of second support elements, each second support element extending in the first direction to be arranged in the second direction intersecting the first direction, wherein the second support structure body is configured to be coupled to the first support structure body by magnetic force when unwound in the second direction from the second roller part and the first roller part, respectively, to support the first flexible display panel,
 wherein two first support elements adjacent to each other among the plurality of first support elements are configured to substantially contact each other in a state where the first flexible display panel has been spread in a substantially flat state; or
 wherein the plurality of first support elements are arranged to be spaced at an interval apart from each other, wherein the interval at which the plurality of first support elements have been spaced apart from each other is smaller than a width of each of the plurality of first support elements.

2. The rollable display device of claim 1,
 wherein the first assembly further comprises:
 a first magnet structure body having a plurality of first magnetic elements and coupled to a back surface of the first support structure body, and
 wherein the first magnet structure body is coupled to the second support structure body by magnetic force.

3. The rollable display device of claim 2,
 wherein the second assembly further comprises:
 a second magnet structure body having a plurality of second magnetic elements and coupled to a back surface of the second support structure body, and
 wherein the second magnet structure body is coupled to the first support structure body by magnetic force.

4. The rollable display device of claim 3, further comprising
 a housing including an opening through which the first assembly and the second assembly pass, wherein the housing is provided to accommodate the first roller part and the second roller part, and
 wherein the first assembly and the second assembly are separated from each other inside the housing while being wound around the first roller part and the second roller part, respectively.

5. The rollable display device of claim 4,
 wherein the first magnet structure body and the second magnet structure body coupled to each other by magnetic force are interposed between the first support structure body and the second support structure body to support the first flexible display panel outside the housing.

6. The rollable display device of claim 4, further comprising
 a guide block received inside the housing, and
 wherein a portion of the first assembly and a portion of the second assembly facing each other with the guide block interposed therebetween are separated from each other by the guide block.

7. The rollable display device of claim 6,
 wherein the guide block is disposed between the first assembly and the second assembly to guide an operation in which the first assembly and the second assembly are separated from each other inside the housing.

8. The rollable display device of claim 4,
 wherein the second assembly further comprises
 a second flexible display panel coupled to the second support structure body, and
 wherein the second support structure body is coupled to the back surface of the second flexible display panel to support the second flexible display panel.

9. The rollable display device of claim 8,
 wherein the first flexible display panel and the second flexible display panel face each other to display images in directions opposite to each other outside the housing.

10. The rollable display device of claim 4, further comprising:
 a first guide roller received in the housing and configured to guide the first assembly; and
 a second guide roller received in the housing and configured to guide the second assembly, wherein the second guide roller is facing the first guide roller and the first assembly and the second assembly are interposed between the first guide roller and the second guide roller, and
 wherein an interval between the first guide roller and the second guide roller is less than an interval between the first roller part and the second roller part.

11. The rollable display device of claim 4,
 wherein the first support structure body comprises
 a plurality of first support elements each extending in a first direction to be arranged in a second direction intersecting the first direction, and
 wherein the first magnet structure body comprises
 a plurality of first magnet elements each extending in the first direction to be arranged in the second direction, and the plurality of first magnet elements coupled with the plurality of first support elements.

12. The rollable display device of claim 11,
wherein the second support structure body comprises
a plurality of second support elements each extending in the first direction to be arranged in the second direction, and
wherein the second magnet structure body comprises
a plurality of second magnet elements each extending in the first direction to be arranged in the second direction, and the plurality of second magnet elements coupled with the plurality of second support elements.

13. The rollable display device of claim 3,
wherein the second assembly further comprises
a flexible base board coupled with the second support structure body, and
wherein the second support structure body is interposed between the base board and the second magnet structure body.

14. A rollable display device, comprising:
a first roller part;
a second roller part facing the first roller part;
a first assembly configured to be wound around the first roller part or unwound from the first roller part; and
a second assembly configured to be wound around the second roller part or unwound from the second roller part to be opposite to the first assembly,
wherein the first assembly comprises:
a first flexible display panel; and
a first support structure body comprising a plurality of first support elements, the first support structure body coupled to a back surface of the first flexible display panel to support the first flexible display panel, and
wherein the second assembly comprises:
a second support structure body comprising a plurality of second support elements coupled with the plurality of first support elements in an uneven structure to support the first flexible display panel,
wherein two first support elements adjacent to each other among the plurality of first support elements are configured to substantially contact each other in a state where the first flexible display panel has been spread in a substantially flat state; or
wherein the plurality of first support elements are arranged to be spaced at an interval apart from each other, wherein the interval at which the plurality of first support elements have been spaced apart from each other is smaller than a width of each of the plurality of first support elements.

15. The rollable display device of claim 14, further comprising
a housing including an opening through which the first assembly and the second assembly pass, wherein the housing is provided to accommodate the first roller part and the second roller part,
wherein the first assembly and the second assembly are separated from each other inside the housing while being wound around the first roller part and the second roller part, respectively, and
wherein the first flexible display panel is supported by the first support structure body and the second support structure body disposed on the back surface of the first flexible display panel and coupled between each other in the uneven structure outside the housing.

16. The rollable display device of claim 15,
wherein the first support structure body is spaced apart from the second support structure body where portions of the first assembly and the second assembly are wound around the first roller part and the second roller part, respectively.

17. The rollable display device of claim 15, further comprising:
a first guide roller received in the housing and configured to guide the first assembly;
a second guide roller received in the housing and configured to guide the second assembly, wherein the second guide roller is facing the first guide roller, and the first assembly and the second assembly are interposed between the first guide roller and the second guide roller, and
a guide block received inside the housing,
wherein a portion of the first assembly and a portion of the second assembly face each other and are separated from each other by the guide block, and
wherein the guide block is disposed between the first assembly and the second assembly to guide an operation in which the first assembly and the second assembly are separated from each other inside the housing.

18. The rollable display device of claim 14,
wherein the second assembly further comprises
a second flexible display panel coupled to the second support structure body, and
wherein the second support structure body is coupled to a back surface of the second flexible display panel to support the second flexible display panel.

19. The rollable display device of claim 14,
wherein at least one first support element of the plurality of first support elements comprises a protrusion protruded toward the second support structure body, and
wherein a second support element corresponding to the first support element of the plurality of second support elements is defined with a receiving groove for receiving the protrusion.

20. The rollable display device of claim 14,
wherein the second assembly further comprises a flexible base board coupled with the second support structure body.

* * * * *